(12) United States Patent
Teranishi et al.

(10) Patent No.: US 8,701,442 B2
(45) Date of Patent: Apr. 22, 2014

(54) MANUFACTURING APPARATUS FOR A GLASS FILM AND MANUFACTURING METHOD FOR A GLASS FILM

(75) Inventors: Yasuo Teranishi, Otsu (JP); Koji Nishijima, Otsu (JP); Koichi Mori, Otsu (JP); Michiharu Eta, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 341 days.

(21) Appl. No.: 13/185,687

(22) Filed: Jul. 19, 2011

(65) Prior Publication Data

US 2012/0024929 A1 Feb. 2, 2012

(30) Foreign Application Priority Data

Jul. 23, 2010 (JP) ................................. 2010-165894

(51) Int. Cl.
*C03B 15/02* (2006.01)

(52) U.S. Cl.
USPC .............................................. 65/196; 65/193

(58) Field of Classification Search
USPC .................................................... 65/193, 196
See application file for complete search history.

(56) References Cited

U.S. PATENT DOCUMENTS

| 3,771,987 | A | * | 11/1973 | Davis et al. ....................... 65/172 |
| 4,385,716 | A | * | 5/1983 | De Roeck et al. ............... 226/18 |
| 6,004,432 | A | * | 12/1999 | Page et al. ...................... 162/281 |
| 6,502,423 | B1 | * | 1/2003 | Ostendarp et al. ........... 65/29.14 |
| 7,007,511 | B2 | * | 3/2006 | Lautenschlager et al. ..... 65/25.3 |
| 7,107,792 | B2 | * | 9/2006 | Langsdorf et al. ............. 65/25.2 |
| 8,397,539 | B2 | * | 3/2013 | Chang et al. .................... 65/245 |
| 2006/0042314 | A1 | * | 3/2006 | Abbott et al. .................. 65/25.3 |
| 2008/0131651 | A1 | | 6/2008 | Burdette et al. |

FOREIGN PATENT DOCUMENTS

| EP | 1 721 872 | 11/2006 |
| JP | 09-052725 | 2/1997 |
| JP | 2009-511398 | 3/2009 |
| JP | 2010-511581 | 4/2010 |
| WO | 2006/121709 | 11/2006 |

OTHER PUBLICATIONS

International Preliminary Report on Patentability and Written Opinion of the International Searching Authority issued Feb. 21, 2013 in International (PCT) Application No. PCT/JP2011/066190.
International Search Report issued Sep. 13, 2011 in corresponding International (PCT) Application No. PCT/JP2011/066190.

* cited by examiner

*Primary Examiner* — Joseph S Del Sole
*Assistant Examiner* — Russell Kemmerle, III
(74) *Attorney, Agent, or Firm* — Wenderoth, Lind & Ponack, L.L.P.

(57) ABSTRACT

A manufacturing apparatus prevents small defects from being formed in a surface of a glass film ribbon to the extent possible when the glass film ribbon is transported toward a downstream side while curved. The apparatus includes a direction converting device for converting a traveling direction of the glass film ribbon, which is drawn downward vertically from a forming device, from a vertical direction to a horizontal direction by transporting the glass film ribbon toward a downstream side while curved in a longitudinal direction of the glass film ribbon. The direction converting device includes a curve-supporting unit for supporting the glass film ribbon curved in the longitudinal direction. The curve-supporting unit includes two lines of end portion supporting parts for supporting widthwise end regions of the glass film ribbon without supporting a widthwise central region of the glass film ribbon.

3 Claims, 4 Drawing Sheets

MANUFACTURING APPARATUS FOR A GLASS FILM AND MANUFACTURING METHOD FOR A GLASS FILM

TECHNICAL FIELD

The present invention relates to an improvement of a technology for manufacturing a glass film.

BACKGROUND ART

In recent years, a CRT display as an image display device has been gradually replaced by a flat panel display (FPD), which is lighter and thinner than the CRT display, such as a liquid crystal display (LCD), a plasma display panel (PDP), a field emission display (FED), or an organic light-emitting diode (OLED) display. Further lightening of any such FPD is being promoted, and hence there arises a need for further thinning a glass substrate corresponding to one of the main components of the FPD.

Further, for example, there is a growing use of an organic light-emitting diode not only for applications to a display that uses TFTs to blink light of three primary colors, but also as a plane light source, such as a backlight of the LCD and a light source for interior illumination, which emits only monochrome (for example, white) light. An illumination device that uses the organic light-emitting diode as a light source may have a freely deformable light-emitting surface as long as the organic light-emitting diode is constructed of a flexible glass substrate. Therefore, from the viewpoint of ensuring sufficient flexibility, there is also promoted further thinning of the glass substrate (forming of the glass substrate as a glass film) to be used for this type of illumination device.

As a manufacturing method for a glass film (sheet glass), for example, there is a method disclosed in Patent Literature 1 described below. Specifically, by a so-called downdraw method, a glass base material is drawn downward vertically to form a glass film ribbon, and the glass film ribbon is transported toward a downstream side while being curved in a longitudinal direction of the glass film ribbon to convert a traveling direction of the glass film ribbon from a vertical direction to a horizontal direction. After that, the glass film ribbon is subjected to a widthwise cutting process to obtain a sheet glass having a predetermined dimension. Note that, depending on the thickness of the glass film ribbon, after the traveling direction is converted into the horizontal direction, the glass film ribbon may be rolled around a roll core without performing the widthwise cutting process, to thereby obtain a so-called glass roll.

CITATION LIST

Patent Literature

[PTL 1] JP 09-52725 A

SUMMARY OF INVENTION

Technical Problem

As means for converting the traveling direction of the glass film ribbon, as described in Patent Literature 1 above, there is/are generally used a conveyor or a plurality of roller members that form (s) a transport path curved into an arc shape. Further, as the conveyor or the roller members, there is/are generally used a conveyor or a plurality of roller members for supporting the entire region of the glass film ribbon in the width direction in a contact manner. However, when the traveling direction of the glass film ribbon is converted under the state in which the entire region of the glass film ribbon in the width direction is supported in a contact manner, along with the contact with the conveyor or the like, defects such as a flaw and a crack are easily formed in a surface of the glass film ribbon, in particular, in a surface of a widthwise central region thereof, which is available as an end product (glass film). In many cases, this type of defect is so small that the defect cannot be located visually, and hence, if the glass film having the defect is directly delivered to the subsequent step, when a predetermined additional process is performed in the subsequent step, unexpected damage or the like is liable to occur in the glass film. The damage or the like to the glass film may cause a great deal of adverse influence onto the production efficiency and the product yield.

The present invention has an object to prevent a small defect from being formed in a surface of a glass film ribbon to the extent possible when a traveling direction of the glass film ribbon is converted from a vertical direction to a horizontal direction, thereby reducing a risk of outflow of a defective item to the subsequent step to the extent possible.

Solution to Problem

According to a first aspect of the present invention provided in order to achieve the above-mentioned object, a manufacturing apparatus for a glass film includes a direction converting device for converting a traveling direction of a glass film ribbon, which is drawn downward vertically from a forming device, from a vertical direction to a horizontal direction by transporting the glass film ribbon toward a downstream side while being curved in a longitudinal direction of the glass film ribbon, the direction converting device including curve-supporting unit for supporting the glass film ribbon in a state of being curved in the longitudinal direction, the curve-supporting unit including two lines of end portion supporting parts for supporting widthwise end regions of the glass film ribbon without supporting a widthwise central region of the glass film ribbon.

Note that, the "vertical direction" mentioned in the present invention also includes a direction slightly inclined with respect to the vertical direction, and similarly, the "horizontal direction" also includes a direction slightly inclined with respect to the horizontal direction. Further, the "glass film" mentioned in the present invention includes a sheet glass cut to a predetermined dimension, and a sheet glass rolled into a roll shape (so-called glass roll). The same applies to the other components according to the present invention described below.

The glass film ribbon drawn downward vertically from the forming device has a thickness controlled by gripping and pulling the widthwise end regions thereof with rolls or the like, and hence only the widthwise central region of the glass film ribbon serves as an available portion of the glass film ribbon. Therefore, as described above, when the curve-supporting unit is constructed of the two lines of end portion supporting parts for supporting the widthwise end regions of the glass film ribbon without supporting the widthwise central region of the glass film ribbon, the contact between the widthwise central region of the glass film ribbon and the curve-supporting unit is avoided during the transport of the glass film ribbon in the curved state. Accordingly, the small defect is unlikely to be formed in the widthwise central region of the glass film ribbon, that is, the available portion, and the outflow of a defective item of the glass film to the subsequent step is suppressed.

Further, according to a second aspect of the present invention provided in order to achieve the above-mentioned object, a manufacturing apparatus for a glass film includes a direction converting device for converting a traveling direction of a glass film ribbon, which is drawn downward vertically from a forming device, from a vertical direction to a horizontal direction by transporting the glass film ribbon toward a downstream side while being curved in a longitudinal direction of the glass film ribbon, the direction converting device including curve-supporting unit for supporting the glass film ribbon in a state of being curved in the longitudinal direction, the curve-supporting unit including: two lines of end portion supporting parts for supporting widthwise end regions of the glass film ribbon; and a central supporting part interposed between the two lines of end portion supporting parts so as to be capable of supporting a widthwise central region of the glass film ribbon, the central supporting part being reciprocable between a supporting position, at which the widthwise central region of the glass film ribbon is supported, and a retreating position, at which the widthwise central region of the glass film ribbon is not supported.

In the early stage of the forming of the glass film ribbon, it is difficult to stabilize forming precision because the leading end portion of the glass film ribbon is in a free state, and what is worse, if the widthwise central region of the glass film ribbon is not totally supported from the stage in which the forming is started, it takes a longer period of time to stabilize the forming precision, resulting in a decrease in production efficiency and yield. In contrast, if the curve-supporting unit includes the central supporting part interposed between the two lines of end portion supporting parts and reciprocable in the above-mentioned manner, the widthwise central region of the glass film ribbon is easily switchable between the supported state and the non-supported state. Therefore, for example, when the central supporting part is situated at the supporting position until the forming precision of the glass film ribbon is stabilized (until a predetermined period of time elapses since the start of the forming) and is situated at the retreating position after the predetermined period of time has elapsed, the small defect is unlikely to be formed in the widthwise central region of the glass film ribbon, that is, the available portion, and in addition, it becomes possible to reduce the period of time to stabilize the forming precision of the glass film ribbon, to thereby attain the improvement in production efficiency and yield. Note that, the portion of the glass film ribbon formed in the early stage is not basically put into practical use, and hence there arises no serious problem even if a flaw or a crack is formed therein.

Further, according to a third aspect of the present invention provided in order to achieve the above-mentioned object, a manufacturing apparatus for a glass film includes a direction converting device for converting a traveling direction of a glass film ribbon, which is drawn downward vertically from a forming device, from a vertical direction to a horizontal direction by transporting the glass film ribbon toward a downstream side while being curved in a longitudinal direction of the glass film ribbon, the direction converting device including curve-supporting unit for supporting the glass film ribbon in a state of being curved in the longitudinal direction, the curve-supporting unit including: two lines of end portion supporting parts for supporting widthwise end regions of the glass film ribbon; and a central supporting part interposed between the two lines of end portion supporting parts so as to be capable of supporting a widthwise central region of the glass film ribbon in a non-contact manner.

Even with the manufacturing apparatus having the above-mentioned structure, the contact between the widthwise central region of the glass film ribbon and the curve-supporting unit is avoided during the transport of the glass film ribbon in the curved state. Accordingly, it is possible to prevent the small defect from being formed in the widthwise central region of the glass film ribbon, that is, the available portion, to the extent possible.

Also in this case, the central supporting part may be reciprocable between a supporting position, at which the widthwise central region of the glass film ribbon is supported in the non-contact manner, and a retreating position, at which the widthwise central region of the glass film ribbon is not supported.

As a specific example of means for supporting the widthwise central region of the glass film ribbon in a non-contact manner, it is conceived that the central supporting part of the curve-supporting unit includes an air supply passage capable of air blast toward the glass film ribbon therethrough.

With this structure, the widthwise central region of the glass film ribbon can be supported in a non-contact manner by an air blast pressure (air space formed between the central supporting part of the curve-supporting unit and the glass film ribbon). In addition, by forming the air space between the central supporting part of the curve-supporting unit and the glass film ribbon, it is possible to absorb, with the air space, a change in stress based on a difference in thickness between the respective portions of the glass film ribbon. Thus, the forming precision of the glass film ribbon and therefore the glass film is improved.

In the above-mentioned structure, the two lines of end portion supporting parts of the curve-supporting unit may each include an air supply passage capable of air blast toward the glass film ribbon therethrough.

With this structure, the widthwise end regions of the glass film ribbon can be supported in a non-contact manner. Accordingly, it is possible to prevent the small defect from being formed in the widthwise end regions of the glass film ribbon along with the contact between the curve-supporting unit (end portion supporting parts) and the glass film ribbon to the extent possible. As a result, adverse influence that may occur due to the small defect formed in the widthwise end regions is unlikely to be imposed on the widthwise central region serving as the available portion.

The two lines of end portion supporting parts may be configured to support the widthwise end regions of the glass film ribbon in a contact manner. In this case, the two lines of end portion supporting parts can be configured to be driven at a speed substantially the same as a transport speed of the glass film ribbon toward the downstream side.

With this structure, the transport of the glass film ribbon in the curved state proceeds as if the glass film ribbon and the end portion supporting parts were integrated with each other. Accordingly, the glass film ribbon is prevented from slidably moving relative to the end portion supporting parts to the extent possible. As a result, the adverse influence that may occur due to the small defect formed in the widthwise end regions of the glass film ribbon can be prevented from being imposed on the widthwise central region serving as the available portion to the extent possible.

The above-mentioned structure is suitably applicable to a case where the formed glass film ribbon has a thickness of 10 μm or more and 300 μm or less in a widthwise central portion (vicinity of the central portion) thereof.

If the thickness of the glass film ribbon falls below 10 μm in its widthwise central portion, rigidity (strength) of the glass film ribbon becomes insufficient. Therefore, in this case, distortion of the glass film ribbon due to the weight of the glass film ribbon itself becomes larger, and a probability of occurrence of a crack (small defect) becomes higher due to unexpected contact between the distortion part and the manufacturing apparatus. In contrast, the glass film ribbon formed in the above-mentioned manner tends to have a thickness larger in the widthwise end regions than in the widthwise central region. Therefore, if the thickness in the widthwise central portion exceeds 300 µm, the thickness in the widthwise end regions becomes too large, resulting in a difficulty in curving the glass film ribbon. From the above-mentioned matters, the present invention is suitable for a case where the formed glass film ribbon has a thickness of 10 µm or more and 300 µm or less in the widthwise central portion (vicinity of the central portion) thereof.

In the above-mentioned structure, it is desired that the forming device be configured to form the glass film ribbon by an overflow downdraw method.

The glass film obtained from the glass film ribbon is used as, for example, a glass substrate for a FPD, and in such an application, work of providing fine elements and wiring on the surface of the glass film is performed in the subsequent step. Therefore, the glass film ribbon needs to have a high smoothness (flatness). In this respect, in the overflow downdraw method, the forming of the glass film ribbon proceeds under a state in which the surface thereof is only held in contact with outside air (atmospheric gas), and hence a higher flatness can be ensured for the glass film ribbon as compared to a forming method such as a slot downdraw method using a nozzle. Note that, the same effect is obtained also by using a forming device for forming the glass film ribbon by a so-called redraw method, in which a temporarily solidified glass base material for fabrication is heated and drawn.

According to a fourth aspect of the present invention provided in order to achieve the above-mentioned object, a manufacturing method for a glass film includes a direction converting step of converting a traveling direction of a glass film ribbon, which is drawn downward vertically from a forming device, from a vertical direction to a horizontal direction by transporting the glass film ribbon toward a downstream side while being curved in a longitudinal direction of the glass film ribbon, the direction converting step including: supporting widthwise end regions of the glass film ribbon; and avoiding supporting a widthwise central region of the glass film ribbon.

With the manufacturing method described above, it is possible to effectively attain the same action and effect as in the case of employing the above-mentioned manufacturing apparatus for a glass film according to the first aspect of the present invention.

Further, according to a fifth aspect of the present invention provided in order to achieve the above-mentioned object, a manufacturing method for a glass film includes a direction converting step of converting a traveling direction of a glass film ribbon, which is drawn downward vertically from a forming device, from a vertical direction to a horizontal direction by transporting the glass film ribbon toward a downstream side while being curved in a longitudinal direction of the glass film ribbon, the direction converting step including: supporting widthwise end regions of the glass film ribbon; and switching between a supported state and a non-supported state of a widthwise central region of the glass film ribbon.

With the manufacturing method described above, it is possible to effectively attain the same action and effect as in the case of employing the above-mentioned manufacturing apparatus for a glass film according to the second aspect of the present invention.

Further, according to a sixth aspect of the present invention provided in order to achieve the above-mentioned object, a manufacturing method for a glass film includes a direction converting step of converting a traveling direction of a glass film ribbon, which is drawn downward vertically from a forming device, from a vertical direction to a horizontal direction by transporting the glass film ribbon toward a downstream side while being curved in a longitudinal direction of the glass film ribbon, the direction converting step including: supporting widthwise end regions of the glass film ribbon; and supporting a widthwise central region of the glass film ribbon in a non-contact manner.

With the manufacturing method described above, it is possible to effectively attain the same action and effect as in the case of employing the above-mentioned manufacturing apparatus for a glass film according to the third aspect of the present invention.

Advantageous Effects of Invention

As described above, according to the present invention, it is possible to prevent the small defect from being formed in the surface of the glass film ribbon to the extent possible when the traveling direction of the glass film ribbon is converted from the vertical direction to the horizontal direction. In this manner, it is possible to reduce a risk of outflow of a defective glass film to the subsequent step to the extent possible, and to contribute to an improvement in processing efficiency and yield in the subsequent step.

DESCRIPTION OF EMBODIMENTS

Hereinbelow, embodiments of the present invention are described with reference to the drawings.

Figure 1:
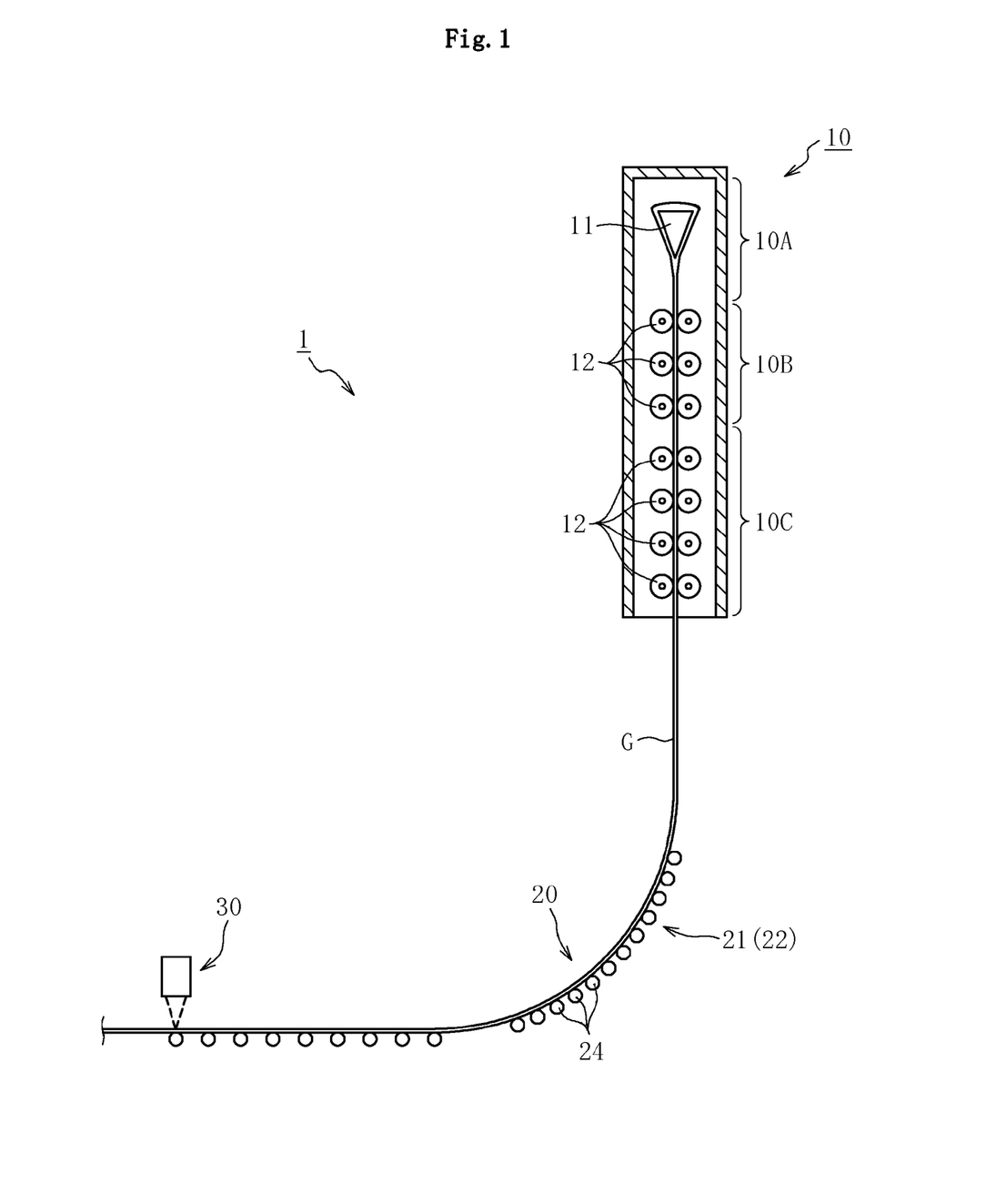
FIG. 1 A partial schematic side view of a manufacturing apparatus for a glass film according to an embodiment of the present invention.

FIG. 1 is a partial schematic side view of a manufacturing apparatus 1 for a glass film according to an embodiment of the present invention. The manufacturing apparatus 1 illustrated in FIG. 1 at least includes a forming device 10 for forming a glass film ribbon G, a direction converting device 20 provided on a downstream side of the forming device 10, and an end portion cutting device 30 provided on a downstream side of the direction converting device 20, for cutting widthwise end regions (both endportions in a width direction) of the glass film ribbon G. On a downstream side of the end portion cutting device 30, there is further provided a rolling device (not shown) for rolling the glass film ribbon G into a roll shape to obtain a roll (glass roll) of the glass film, or a widthwise cutting device (not shown) for cutting the glass film ribbon G in the width direction to obtain a sheet glass having a predetermined dimension.

The forming device 10 forms the glass film ribbon G by drawing downward molten glass vertically, and inside the forming device 10, a forming zone 10A, an annealing zone 10B, and a cooling zone 10C are provided sequentially from a vertical upper side to a vertical lower side. In the forming zone 10A, a forming member 11 having a wedge shape in cross section is arranged, and in the annealing zone 10B and the cooling zone 10C, a plurality of roller members 12 are arranged at predetermined intervals. The roller members 12 are provided in pairs on the front side and back side of the glass film ribbon G so as to sandwich the glass film ribbon G. Of the roller members 12 (pairs of the roller members 12) arranged respectively in the annealing zone 10B and the cooling zone 10C, at least the roller members 12 situated in the uppermost part of the annealing zone 10B function as cooling rollers for cooling the glass film ribbon G, and also as drive rollers for drawing downward the glass film ribbon G vertically. Part or all of the other roller members 12 arranged in the annealing zone 10B, and part or all of the roller members 12 arranged in the cooling zone 10C may be draggably rotating gravity rollers (guide rollers) or may be drive rollers.

The forming device 10 having the above-mentioned structure forms the glass film ribbon G in the following manner. First, when molten glass is fed from a melting furnace (not shown) to the forming member 11, the molten glass overflows from a top portion of the forming member 11, and the streams of overflown molten glass passing along both side surfaces of the forming member 11 converge at a lower end of the forming member 11 so that forming of the glass film ribbon G is started. Thereafter, by feeding the molten glass successively to the forming member 11, the glass film ribbon G is formed successively. The glass film ribbon G thus formed directly flows downward vertically, and is annealed by passing through the annealing zone 10B provided below the forming zone 10A, with the result that a residual strain is removed. Then, when the glass film ribbon G after the residual strain is removed passes through the cooling zone 10C, the glass film ribbon G is cooled approximately to room temperature.

The above-mentioned method of forming the glass film ribbon G is a so-called overflow downdraw method. In the overflow downdraw method, the forming of the glass film ribbon G proceeds under a state in which the surface thereof is only held in contact with outside air (atmospheric gas in the forming device 10), and hence there is an advantage that high flatness can be ensured for the glass film ribbon G. Therefore, in a case where a glass film obtained from the glass film ribbon G is used as, for example, a glass substrate for a FPD, it becomes easy to form fine elements and wiring on the surface with high precision.

The glass film ribbon G delivered from the lower end of the forming device 10 (passing through the cooling zone 10C) is transported (transferred) to the direction converting device 20. When the glass film ribbon G is transported along the direction converting device 20, the traveling direction of the glass film ribbon G is converted from the vertical direction to the horizontal direction.

Figure 2A:
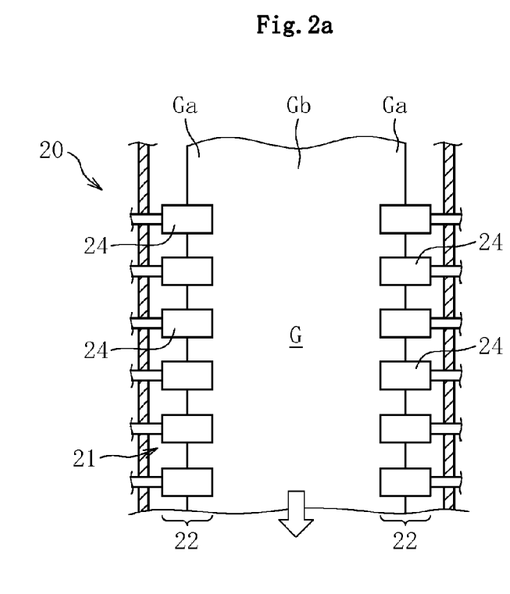
FIG. 2A A main part front view of FIG. 1.
Figure 2B:
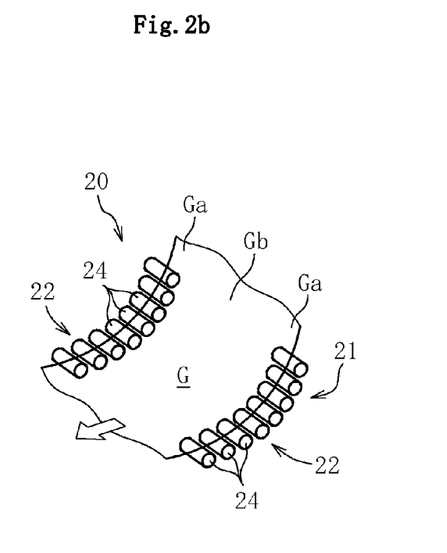
FIG. 2B A main part perspective view of FIG. 1.

The direction converting device 20 includes curve-supporting unit 21 for supporting the glass film ribbon G in a state of being curved in a longitudinal direction. As illustrated in FIGS. 2A and 2B, the curve-supporting unit 21 of this embodiment is constructed of two lines of end portion supporting parts 22 and 22 for supporting widthwise end regions Ga and Ga of the glass film ribbon G without supporting a widthwise central region Gb of the glass film ribbon G. In other words, the curve-supporting unit 21 of this embodiment does not include means for supporting the widthwise central region Gb of the glass film ribbon G. Each end portion supporting part 22 is constructed of a line of roller members 24 arranged at predetermined intervals along the longitudinal direction of the glass film ribbon G so as to form a transport path in an arc shape, which is curved at a predetermined curvature, the roller members 24 supporting the widthwise end region Ga of the glass film ribbon G in a contact manner.

In this embodiment, all of the roller members 24 that construct the end portion supporting part 22 are constructed of drive rollers that are rotatably driven. A rotation speed of each roller member 24 is set substantially the same as a transport speed (traveling speed) of the glass film ribbon G toward the downstream side. It is desired that at least part of the roller member 24 to be brought into contact with the glass film ribbon G be formed of an elastic material (soft material) such as a resin and a rubber, so as to suppress or prevent a flaw or the like from being formed in the glass film ribbon G.

Because the direction converting device 20 has the above-mentioned structure, when the glass film ribbon G is transported toward the downstream side along the direction converting device 20 (direction converting step), the glass film ribbon G is curved into an arc shape in the longitudinal direction. In this manner, the transport of the glass film ribbon G toward the downstream side proceeds in the state in which the glass film ribbon G is curved in the longitudinal direction, and thus the traveling direction of the glass film ribbon G is converted from the vertical direction to the horizontal direction. Then, when the glass film ribbon G reaches the end portion cutting device 30, the widthwise end regions Ga and Ga of the glass film ribbon G are cut. Although specific illustration and description are omitted herein, as the endportion cutting device 30, for example, a so-called snapping device or laser cleaving device may be used. With the end portion cutting device 30, the glass film ribbon G is divided into the widthwise end region Ga and the widthwise central region Gb. The widthwise end region Ga is discarded, while the widthwise central region Gb is further transported toward the downstream side and cut in the width direction so that a glass film having a predetermined length (glass roll or sheet glass having a predetermined dimension) is obtained through the process. Note that, the glass film ribbon G is herein cut in the width direction after the widthwise end regions Ga and Ga are cut, but conversely, the glass film ribbon G may be first subjected to a widthwise cutting process, followed by the cutting of the widthwise end regions Ga and Ga.

As described above, only the widthwise central region Gb of the glass film ribbon G serves as an available portion of the glass film ribbon G. Therefore, as described above, when the curve-supporting unit 21 is constructed of the two lines of end portion supporting parts 22 and 22 for supporting the widthwise end regions Ga and Ga of the glass film ribbon G without supporting the widthwise central region Gb of the glass film ribbon G, the contact between the widthwise central region Gb of the glass film ribbon G and the curve-supporting unit 21 is avoided during the transport of the glass film ribbon G in the curved state. Accordingly, it is possible to prevent a small defect from being formed in the widthwise central region Gb serving as the available portion to the extent possible, thereby reducing the risk of outflow of a defective item of the glass film to the subsequent step to the extent possible.

Further, in the embodiment of the present invention, in which the two lines of end portion supporting parts 22 and 22 are respectively constructed of the lines of roller members 24 structured by drive rollers, for supporting the widthwise end regions Ga and Ga of the glass film ribbon G in a contact manner, the rotation speed of each roller member 24 is set substantially the same as the transport speed of the glass film ribbon G toward the downstream side. Thus, the direction conversion of the glass film ribbon G (transport of the glass film ribbon G in the curved state toward the downstream side) proceeds as if the roller members 24 (end portion supporting part 22) and the glass film ribbon G were integrated with each other. Accordingly, the glass film ribbon G is prevented from slidably moving relative to the end portion supporting part 22 to the extent possible, and thus the small defect is unlikely to be formed in the widthwise end region Ga of the glass film ribbon G. As a result, adverse influence that may occur due to the small defect formed in the widthwise end region Ga is unlikely to be imposed on the widthwise central region Gb.

Note that, in particular, if no serious problem arises even when the widthwise end region Ga of the glass film ribbon G slidably move relative to the end portion supporting part 22, the end portion supporting part 22 may be constructed of draggably rotating roller members 24 (guide rollers) alone, or may in part be constructed of roller members that are rotatably driven and in other part be constructed of draggably rotating roller members.

When the glass film ribbon G is transported in the curved state in the above-mentioned manner, if the thickness of the glass film ribbon G falls below 10 μm in its widthwise central portion, widthwise distortion of the glass film ribbon G due to the weight of the glass film ribbon G itself becomes larger because of a shortage of rigidity (strength) of the glass film ribbon G. In this case, the small defect such as a crack easily occurs due to unexpected contact between the distortion part and the manufacturing apparatus. Further, the glass film ribbon G formed in the above-mentioned manner tends to have a thickness larger in the widthwise end region Ga than in the widthwise central portion. Therefore, if the thickness in the widthwise central portion exceeds 300 μm, the thickness in the widthwise end region Ga becomes too large, resulting in a difficulty in curving the glass film ribbon G at the predetermined curvature. Thus, it is desired that the forming device 10 to be used be capable of forming the glass film ribbon G having a thickness of 10 μm or more and 300 μm or less in the widthwise central portion (vicinity of the central portion).

Note that, considering the curve deformability of the glass film ribbon G, it is more preferred that the forming device 10 be capable of forming the glass film ribbon G having a thickness of 200 μm or less in the widthwise central portion, even more preferably 100 μm or less, most preferably 50 μm or less.

Hereinabove, the description has been given of the manufacturing apparatus for a glass film according to the embodiment of the present invention, but the present invention is not limited thereto, and various modifications may be made thereto, especially to the direction converting device 20.

Figure 3A:
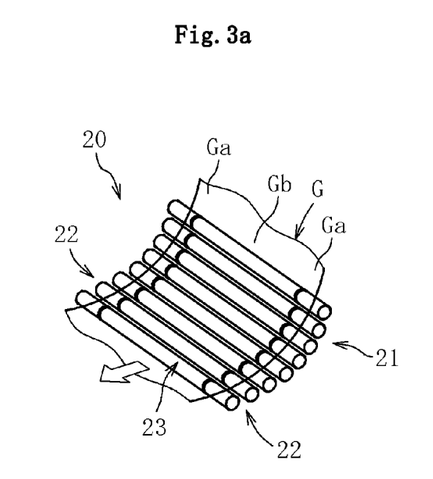
FIG. 3A A main part perspective view of a manufacturing apparatus for a glass film according to another embodiment of the present invention.
Figure 3B:
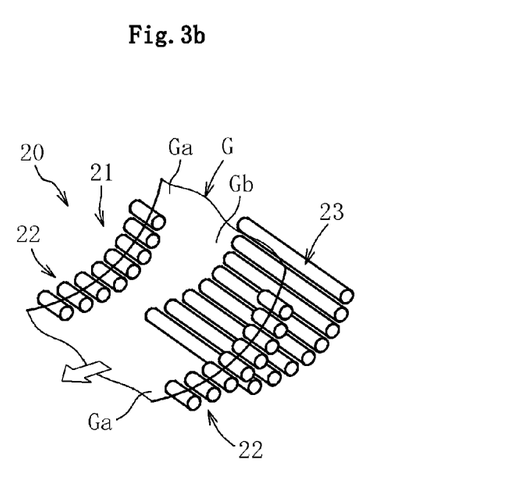
FIG. 3B A main part perspective view of the manufacturing apparatus for a glass film according to the another embodiment of the present invention.

FIGS. 3A and 3B are main part perspective views of a manufacturing apparatus for a glass film according to another embodiment of the present invention. FIGS. 3A and 3B illustrate a modification example of the direction converting device 20 illustrated in FIGS. 2A and 2B. Specifically, the curve-supporting unit 21 includes the two lines of end portion supporting parts 22 and 22 for supporting the widthwise end regions Ga and Ga of the glass film ribbon G, and a central supporting part 23 interposed between the end portion supporting parts 22 and 22 so as to be capable of supporting the widthwise central region Gb of the glass film ribbon G. The central supporting part 23 is reciprocable between a supporting position (FIG. 3A), at which the widthwise central region Gb of the glass film ribbon G is supported (supported in a contact manner), and a retreating position (FIG. 3B), at which the widthwise central region Gb of the glass film ribbon G is not supported.

Such structure is suitably applicable to a case where, after the forming of the glass film ribbon G is started, the forming precision of the glass film ribbon G is to be stabilized as early in the stage as possible.

Specifically, in the early stage of the forming of the glass film ribbon G, it is difficult to stabilize the forming precision because the leading end portion of the glass film ribbon G is in a free state, and what is worse, if the widthwise central region Gb of the glass film ribbon G is not totally supported from the stage in which the forming of the glass film ribbon G is started, it takes a longer period of time to stabilize the forming precision, resulting in a decrease in production efficiency and yield. In contrast, if the curve-supporting unit 21 includes the central supporting part 23 reciprocable in the above-mentioned manner, the widthwise central region Gb of the glass film ribbon G is easily switchable between the supported state and the non-supported state. Therefore, when the central supporting part 23 is configured to stand by at the supporting position until the forming precision of the glass film ribbon G is stabilized (until a predetermined period of time elapses since the start of the forming) and retreat to the retreating position after the predetermined period of time has elapsed, the small defect is unlikely to be formed in the widthwise central region Gb of the glass film ribbon G, that is, the available portion, and in addition, it becomes possible to reduce the period of time to stabilize the forming precision of the glass film ribbon G, to thereby attain the improvement in production efficiency and yield.

Further, the direction converting device 20 can convert the traveling direction of the glass film ribbon G from the vertical direction to the horizontal direction by transporting the glass film ribbon G in the curved state toward the downstream side in a state of supporting the widthwise end regions Ga and Ga in a non-contact manner. As illustrated in, for example, FIGS. 4A and 4B, such structure can be attained by constructing each end portion supporting part 22 of a line of roller members 25 having air supply holes (air blast holes) capable of air blast toward the glass film ribbon G therethrough. Examples of the roller members 25 to be used may include a roller member made of a porous material such as a sintered metal, a porous resin (foamed resin), and ceramics, or a roller member obtained by forming through-holes in a non-porous member. Note that, in this case, the roller members 25 are each at least provided with air supply holes having such directivity that a floating force can be imparted to the glass film ribbon G. In addition, the roller members 25 may each be provided with air supply holes having such directivity that a feeding force toward the downstream side can be imparted to the glass film ribbon G.

Figure 4A:
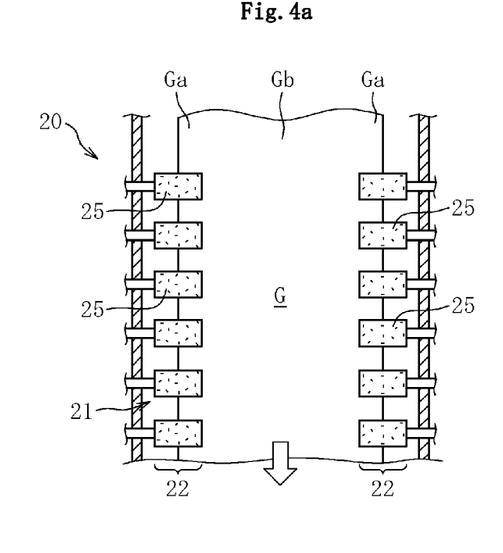
FIG. 4A A main part front view of a manufacturing apparatus for a glass film according to a further embodiment of the present invention.
Figure 4B:
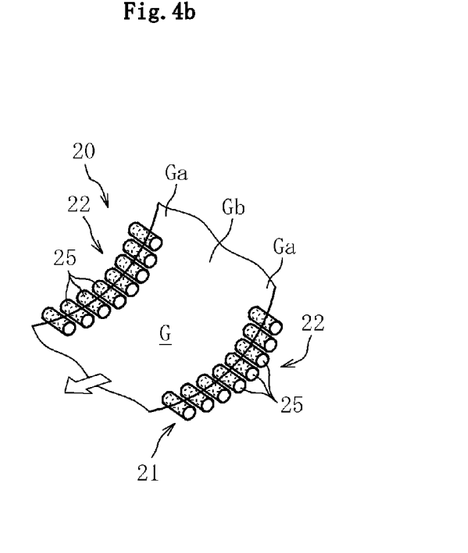
FIG. 4B A main part perspective view of the manufacturing apparatus for a glass film according to the further embodiment of the present invention.

With this structure, the transport of the glass film ribbon G in the curved state toward the downstream side proceeds in the state in which the widthwise end regions Ga and Ga of the glass film ribbon G do not come into contact with the end portion supporting part 22 of the curve-supporting unit 21.

Thus, the small defect is unlikely to be formed in the widthwise end regions Ga and Ga of the glass film ribbon G. As a result, the adverse influence that may occur due to the small defect formed in the widthwise end regions Ga and Ga can be prevented from being imposed on the widthwise central region Gb to the extent possible, and accordingly the glass film having a still higher quality can be obtained.

Figure 5A:
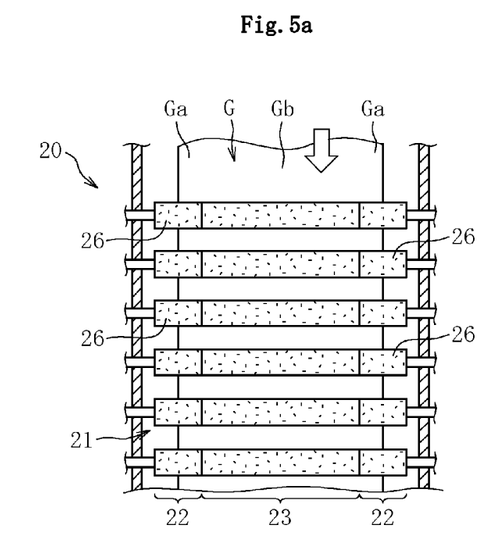
FIG. 5A A main part front view of a manufacturing apparatus for a glass film according to a still further embodiment of the present invention.
Figure 5B:
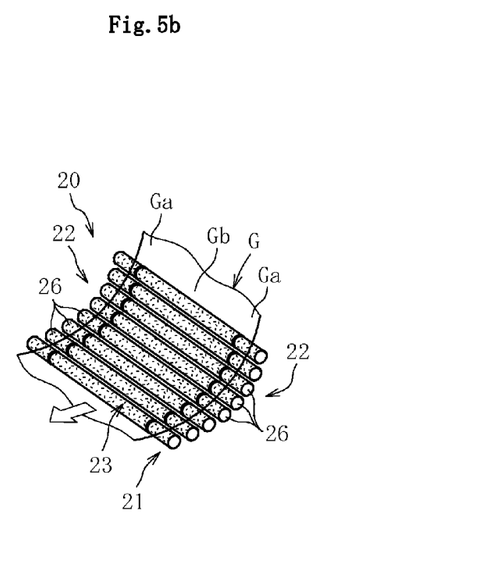
FIG. 5B A main part perspective view of the manufacturing apparatus for a glass film according to the still further embodiment of the present invention.

Further, as illustrated in FIGS. 5A and 5B, the curve-supporting unit 21 of the direction converting device 20 may include the two lines of end portion supporting parts 22 and 22 for supporting the widthwise end regions Ga and Ga of the glass film ribbon G in a non-contact manner, and the central supporting part 23 interposed between the end portion supporting parts 22 and 22 so as to support the widthwise central region Gb of the glass film ribbon G in a non-contact manner. In this embodiment, the two lines of end portion supporting parts 22 and 22, and the central supporting part 23 are constructed of a line of roller members 26 having the air supply holes and extending so as to cross the glass film ribbon G in the width direction.

Even in this case, the contact between the widthwise central region Gb of the glass film ribbon G and the curve-supporting unit 21 is avoided during the transport of the glass film ribbon G in the curved state. Accordingly, it is possible to prevent the small defect from being formed in the widthwise central region Gb of the glass film ribbon G, that is, the available portion, to the extent possible. In particular, because each roller member 26 that constructs the central supporting part 23 has the air supply holes, an air space can be formed between the central supporting part 23 of the curve-supporting unit 21 and the glass film ribbon G during the transport of the glass film ribbon G in the curved state. By forming such an air space, it is possible to absorb a change in stress based on a difference in thickness between the respective portions of the glass film ribbon G. Thus, it is also possible to improve the forming precision of the glass film ribbon G and therefore the glass film.

Note that, the curve-supporting unit 21 illustrated in FIGS. 5A and 5B integrally includes the two lines of end portion supporting parts 22 and 22, and the central supporting part 23, but alternatively, the curve-supporting unit 21 may include those sections separately and independently from each other, and similarly to the embodiment described with reference to FIGS. 3A and 3B, the central supporting part 23 may be reciprocable between the supporting position, at which the widthwise central region Gb of the glass film ribbon G is supported (supported in a contact manner), and the retreating position, at which the widthwise central region Gb of the glass film ribbon G is not supported.

Figure 6A:
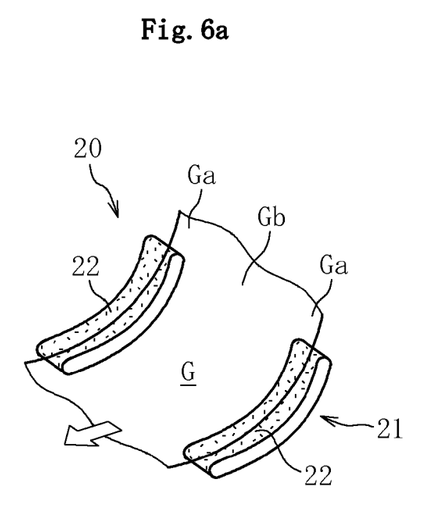
FIG. 6A A main part perspective view of a manufacturing apparatus for a glass film according to a yet further embodiment of the present invention.
Figure 6B:
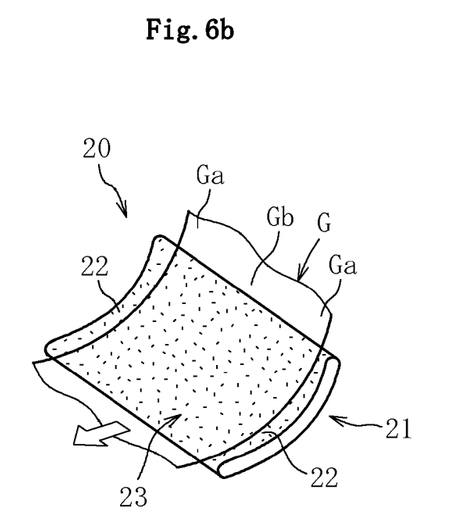
FIG. 6B A main part perspective view of the manufacturing apparatus for a glass film according to the yet further embodiment of the present invention.

In the embodiments described above, the two lines of end portion supporting parts 22 and 22, and the central supporting part 23 are both constructed of the line of roller members arranged at the predetermined intervals along the longitudinal direction of the glass film ribbon G. Alternatively, as illustrated in FIGS. 6A and 6B, any one or both of the two lines of end portion supporting parts 22 and 22, and the central supporting part 23 may be constructed of a conveyor extending so as to be curved along the longitudinal direction of the glass film ribbon G. Note that, FIG. 6A illustrates an example in which each end portion supporting part 22 is constructed of the conveyor in a case where the curve-supporting unit 21 is constructed only of the two lines of end portion supporting parts 22 and 22, and FIG. 6B illustrates an example in which both the supporting sections 22 and 23 are constructed of the conveyor in a case where the curve-supporting unit 21 is constructed of the two lines of end portion supporting parts 22 and 22, and the central supporting part 23.

Further, the above description is directed to the case where the present invention is applied to the manufacturing apparatus 1 for a glass film having built thereto the forming device 10 for forming the glass film ribbon G by the so-called overflow downdraw method. Alternatively, the present invention is also suitably applicable to a manufacturing apparatus 1 for a glass film having built thereto a forming device for forming the glass film ribbon G by a so-called redraw method, in which a solidified glass base material for fabrication is heated and drawn.

REFERENCE SIGNS LIST 1 manufacturing apparatus for a glass film
10 forming device
10A forming zone
10B annealing zone
10C cooling zone
20 direction converting device
21 curve-supporting unit
22 end portion supporting part
23 central supporting part
24 roller member
25 roller member
30 end portion cutting device
G glass film ribbon
Ga widthwise end region
Gb widthwise central region

The invention claimed is:

1. A manufacturing method for a glass film, comprising a direction converting step of converting a traveling direction of a glass film ribbon, which is drawn downward vertically from a forming device, from a vertical direction to a horizontal direction by transporting the glass film ribbon toward a downstream side while being curved in a longitudinal direction of the glass film ribbon,
  the direction converting step comprising:
    supporting widthwise end regions of the glass film ribbon; and
    switching between a supported state and a non-supported state of a widthwise central region of the glass film ribbon.

2. The manufacturing method for a glass film according to claim 1, wherein the glass film ribbon has a thickness of 10 µm or more and 300 µm or less in a widthwise central portion thereof.

3. The manufacturing method for a glass film according to claim 1, wherein the forming device is configured to form the glass film ribbon by an overflow downdraw method.

* * * * *